United States Patent [19]
Schomer

[11] Patent Number: 6,108,617
[45] Date of Patent: Aug. 22, 2000

[54] METHOD FOR TRACKING CHEMICALS

[75] Inventor: Dawne P. Schomer, Garland, Tex.

[73] Assignee: Texas Instruments Incorporated, Dallas, Tex.

[21] Appl. No.: 08/529,303

[22] Filed: Sep. 18, 1995

Related U.S. Application Data

[63] Continuation of application No. 08/238,569, May 5, 1994, abandoned.

[51] Int. Cl.[7] .................................................... G06F 15/00
[52] U.S. Cl. ............................................................ 702/188
[58] Field of Search .................................. 364/403, 500, 364/468; 235/775, 385

[56] References Cited

U.S. PATENT DOCUMENTS

| | | | |
|---|---|---|---|
| 4,646,238 | 2/1987 | Carlson, Jr. et al. | 364/403 |
| 4,855,909 | 8/1989 | Vincent et al. | 364/413.01 |
| 5,089,970 | 2/1992 | Lee et al. | 364/468 |
| 5,099,437 | 3/1992 | Weber | 364/550 |
| 5,154,314 | 10/1992 | Van Wormer | 221/1 |
| 5,199,606 | 4/1993 | Nutting | 222/30 |
| 5,206,818 | 4/1993 | Speranza | 364/550 |
| 5,231,938 | 8/1993 | Gore | 110/346 |
| 5,311,438 | 5/1994 | Sellers et al. | 364/468 |

OTHER PUBLICATIONS

Shearman et al., "Chemputers Stay on Top of Environmental Regulations: Software helps users comply with a myriad of laws", 1992.

Snyder "Integration Becoming the key Ingredient in Evolution of Environmental Software", 1992.

*Primary Examiner*—Patrick Assouad
*Attorney, Agent, or Firm*—Robert L. Troike; Tammy L. Williams; Frederick J. Telecky, Jr.

[57] ABSTRACT

A method for establishing a correspondence between chemical use and the process where use occurs. The process is assigned a process identification number (PIN). After chemicals have been assigned into an inventory, the chemicals are assigned to the process and a report is generated reporting the chemical use corresponding to the process.

2 Claims, 1 Drawing Sheet

METHOD FOR TRACKING CHEMICALS

This application is a Continuation of application Ser. No. 08/238,569, filed May 5, 1994 now abandoned.

TECHNICAL FIELD OF THE INVENTION

The present invention relates to tracking systems and more particularly to a method and apparatus for tracking a process corresponding to chemicals, for example, hazardous chemicals.

BACKGROUND OF THE INVENTION

The amount of environmental information that an organization is required by the government to collect and report is enormous and increasing. Prior to 1976, the environmental engineer assigned to the task of collecting and reporting this environmental information merely ensured that the hazardous waste was handled and disposed in compliance with government regulations, without specifying the details of how that information related to chemical use. However, in 1986, the Superfund Amendment and Reauthorization Act (SARA) was added. This law required that industry track and report chemical use through numerous and voluminous reports. The SARA act requires that industry know the amount and location of each chemical used in that industry, as well as the final point of disposition (air emissions, containerized waste, and wastewater discharge, for example). Additional laws, including the 1990 Pollution Prevention Act and the new Clean Air Act, added additional requirements resulting in further increases in the number and volume of required reports.

In the future, this trend toward more detailed reports is expected to continue. It is expected that governmental requirements will increase beyond those dictated by the current laws.

For the environmental engineer at a manufacturing site subject to these laws, obtaining information on chemical use is difficult because a specific chemical is usually not dedicated to a specific product or use. Without direct information, the engineer must prepare reports on chemical use by obtaining information on the chemical to be used, and the specific facility location of the chemical use. They may request information from various sources such as materials handling, chemical operations, facility operations, etc. The information is then used to prepare environmental reports on chemical use for a specified time period, at a specific industrial site. The information may include printouts of computer information, records of raw materials delivered to the site, or records of subcontractors indicating chemicals which were brought and consumed on the site (cleaning, pesticide applications, and stock room issuance for instance). The environmental engineer attempts to compile this information by chemical ingredient using the chemical information from the Material Safety Data Sheet and from the product vendor. Quantities of chemicals purchased are then enumerated by multiplying the amount of the product purchased and used during that timespan by the percent of the product represented by each chemical ingredient. These individual totals are then added up so that the final data enumerates how much of each chemical ingredient was used entotal during that timespan. This data calculated in the above described manner satisfies some of the requirements of the current laws, for example SARA 311/312. Evaluating chemical use via such limited resources inherently introduces a certain degree of potential inaccuracy into report quantities. In addition, some of these reports required by law, (for example, SARA 313 toxic chemical release inventory, air emissions inventories, and pollution prevention) require even more accurate information. These laws require that reports include the ultimate destination of each chemical ingredient. For example, the environmental engineer must provide information on how much of the chemical went into the atmosphere via air emissions, how much was represented in containerized waste and how much was discharged into waste waters. One method of determining this "mass balance" quantity per chemical ingredient is to obtain the evaporation rate of a particular chemical product and to presume that, regardless of the process where the chemical product is used, a specified amount of the chemical ingredient has evaporated into the atmosphere. The accuracy of this mass balance approach has been questioned.

To summarize, most chemical use industries order chemicals, and when these chemicals are delivered to the site they are picked up and used with no further record keeping. Without knowledge on what chemical products are used at what process, the mass balance or chemical use and emissions estimates used to formulate the data for reports such as the SARA 313 Toxic Chemical Release Inventory Report must be based on high level data and on assumptions of chemical dispersion which do not take into account the wide range of process conditions and resulting chemical dispersion opportunities.

OBJECTS OF THE INVENTION

It is an object of the present invention to provide a method and apparatus to track the use of chemical products in a manufacturing facility and to report that use at the process level.

It is another object of the present invention to assign a process identification number (PIN) to each process.

It is another object of the present invention to provide limited access to the data surrounding the tracking of the chemicals.

It is a further object of the present invention to assign chemicals to inventory status.

It is a further object of the invention to assign the chemicals to the process by the PIN number.

It is a further object of the invention to report the chemicals or ingredients used in a process to the user.

SUMMARY OF THE INVENTION

The present invention tracks and reports chemical products, that are used in a process.

The present invention assigns PIN numbers to each process.

The present invention assigns to a limited number of people the access and responsibility for tracking of chemical use.

The present invention assigns chemical products to inventory status.

The present invention assigns chemical products to the process by the PIN number.

DETAILED DESCRIPTION OF THE INVENTION

Figure 1:
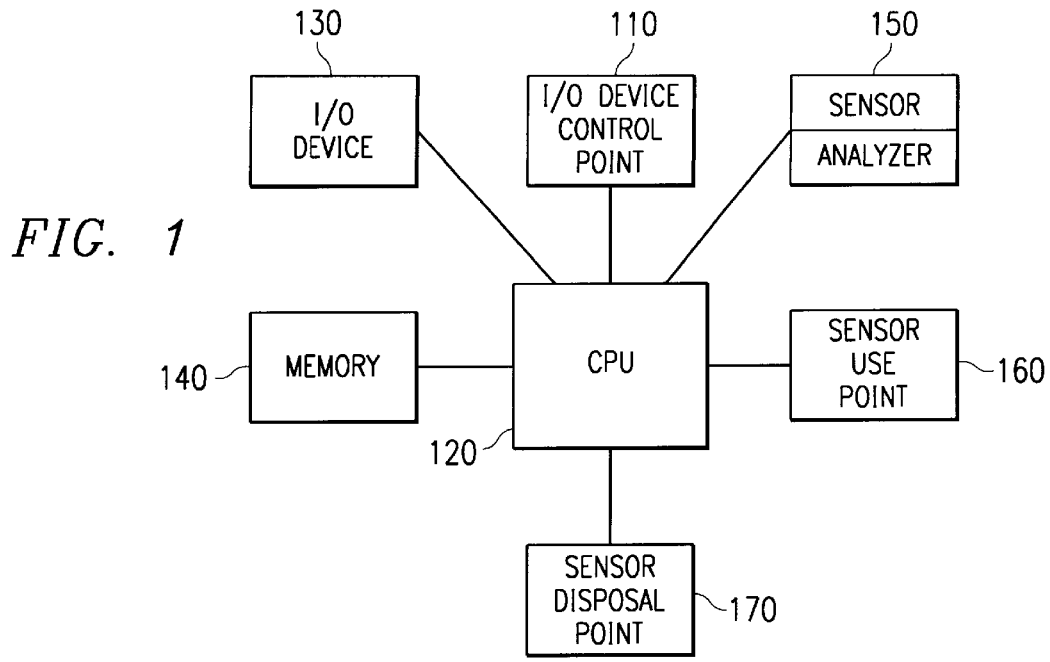
FIG. 1 illustrate a block diagram of the present invention.

Referring to FIG. 1, a central processing unit CPU 120 (for example, a mini-computer, a microcomputer, or a personal computer) is coupled to an in-out I/O device 110 positioned at a chemical control point. I/O device 110 may be a display screen of a personal computer. The CPU 120 may be connected to sensor 150, which is additionally positioned at the chemical control point to sense chemicals including the ingredients of the chemicals. Further, the CPU 120 is coupled to I/O device 130 to produce various reports for the user. The CPU 120 is coupled to memory 140 in order to store data, for example the chemical and ingredients, which is required by the present invention. Sensor 160 and sensor 170 may be positioned at a use point and a disposal point, respectively, and may be coupled to CPU 120 respectively, and the sensor 160 for example, may be positioned in a smoke stack in order to detect chemicals which evaporate from the process. Sensor 170 may be used to detect by-products of the process, for example waste water.

In accordance with the present invention, a plurality of chemical control points could be located at predetermined locations within a manufacturing facility to track the chemicals used by the site to the process where they are used or processed further. After chemicals are delivered to a site's chemical dock, the chemicals are further delivered to the chemical control point, for example at the Texas Instruments Lewisville plant in Texas. The operator of the control point has been authorized access to the I/O device 110, by an operator identification number. The operator of the chemical control point enters into the memory 140 through I/O device 110 data corresponding to the chemical, for example, a description of the chemical.

Table 1 illustrates an example of the format for entering the data corresponding to the chemicals that may be used. As illustrated in Table 1, the Chemical Control Point operator, through a display screen of the I/O device 110, inputs the control point identifier of the chemical Control Point; the product or chemical number received at the control point; the quantity of the chemical received; and data indicating where the chemical was received from. Chemicals may be received from another chemical control point, a process, a purchase order (PO) number from which the chemical was purchased, an employee number of the person who brought the product to the control point, or an identification ticket or identification trace number. After the data has been entered through the display screen, the data is stored in memory 140, and the chemical is physically stored in inventory.

The chemical user requires chemicals for use at a process. In order to remove these chemicals from inventory and issue them to a process, another display of the I/O device 110 must be utilized. Table 2 illustrates format of a display to remove chemicals from inventory. In order for the chemical to be released from inventory to a particular process, the operator of the chemical control point inputs data into the I/O device 110 such as that illustrated in Table 2.

TABLE 1

CT10 Field Definitions

| Field Name | Description |
| --- | --- |
| Into Control Point | An 8-digit alphanumeric code. The control point identifier of the receiving control point. |
| Location | A 30-digit alphanumeric code. Description of the control point's location (display only). |
| TI Part #/C# | A 12-digit alphanumeric code. Identifies a product to be received. This may be a TI Part Number or CHEMTRACK number. |
| Quantity | An 8-digit numeric field. The number of inventory units to be received by the control point. See CT30 for Quantity Unit of Measure. |
| UM | A 2-character field. The Quantity unit of measure of the product. See Appendix A of User Guide for description (display only). |
| Received From | A 13-digit alphanumeric field. Valid entries are:<br>a) the control point from which the product was received; or<br>b) the process from which the product was received; or<br>c) the PO number on which the product was purchased. Entry should start with a # PO (Ex. #PO987654321); or<br>d) the employee number of the person who brought the product to the control point. Entry should start with the # sign (Ex. #123456); or<br>e) the INV/WHS SR ticket # or INTRANSIT trace number on the product. Entry should start with the # sign (Ex. #WH061081). |
| Product Description | A 25-digit alphanumeric field. Describes the product (display only). |
| Printer Lterm | A 6-digit alphanumeric field. Indicates the printer lterm where output should be printed. |
| () | A 64-digit alphanumeric field. Use to access another screen. Type the screen number after the brackets, then press [Enter]. |

TABLE 2

CT20 Field Definitions

| Field Name | Description |
| --- | --- |
| From | A 13-digit alphanumeric code. Valid entries are:<br>a) the control point from which the product is to be issued; or<br>b) the process from which the product is to be issued; or<br>c) the PO number on which the product was purchased. Entry should start with a # PO (Ex. #PO987654321); or<br>d) the employee number of the person having the product to be issued. Entry should start with the # sign (Ex. #123456); or<br>e) the INV/WHS SR ticket # or INTRANSIT trace number on the product. Entry should start with the # sign (Ex. #WH061081). |
| Location | A 30-digit alphanumeric code. Description of the control point's location (display only). |
| TI Part #/C# | A 12-digit alphanumeric code. Identifies a product to be issued. This may be a TI Part Number or CHEMTRACK number. |
| Quantity | An 8-digit numeric field. The number of inventory units being issued. See CT30 for Quantity Unit of Measure. |
| UM | A 2-character field. The quantity unit of measure of the product. See Appendix A of User Guide for description (display only). |
| Issued To | A 13-digit alphanumeric field. A process to which the product is to be issued. |
| Product Description | A 25-digit alphanumeric field. Describes the product (display only). |
| Printer Lterm | A 6-digit alphanumeric field. Indicates the printer lterm of the printer where output should be printed. |
| () | A 64-digit alphanumeric field. Use to access another screen. Type the screen number after the brackets, then press [Enter]. |

The operator of the chemical control point inputs the alphanumeric field, (for example a "received from" field corresponding to the received from field when the chemical information was input), the product to be issued, (for example, the part number or the chemical track number) the quantity of the chemical to be issued, and a PIN or process number to which the product is to be issued. The I/O device 110 in response displays the unit of measure and the product description. This data is retrieved from memory 140.

The users of the process may request to display data stored in memory 140, and to add data to the database.

the chemical product part number or description may be entered to identify the chemical or the part number.

The operator of the chemical control point may desire to obtain data corresponding to a specific chemical or add a chemical number to the memory 140 or an organization part number to the memory 140.

Similarly an organization part number may be added by positioning an "A" in the option field and by positioning in the organization part number the description, standard amount, standard unit of measure, quantity unit of measure, container type, owning division and the names of the chemi-

TABLE 3

CT30 Field Definitions

| Field Name | Description |
| --- | --- |
| Option | A 1-character field. Indicates whether to Show or Add the product information. S—Show, A—Add |
| TI Part #/C# | A 12-digit alphanumeric code. Identifies a product. This may be a TI Part Number or number which has been assigned by CHEMTRACK |
| Product Description | A 40-digit alphanumeric field. Describes the product. For guidelines, press F1 or see Appendix A of User Guide. |
| Standard Amount | An 8-digit numeric field. Standard amount of the product associated with the given product. |
| Std Unit of Measure | A 2-character field. Standard unit of measure associated with the given product. For valid values, press F1 or see Appendix A of User Guide. |
| Container Type | A 1-character field. Container type. For valid values, press F1 or see Appendix A of User Guide. |
| Qty Unit of Measure | A 2-character field. Inventory unit of measure associated with the given product. The unit in which the product will be received and issued. For valid values, press F1. |
| Owning Division | A 3-digit alphanumeric code. Identifies the originator of the TI Part #/C# of the product. This is usually the number of a Division. |
| Manufacturers | A 40-digit alphanumeric field. Use to display or input a chemical manufacturer's name(s). |
| () | A 64-digit alphanumeric field. Use to access another screen. Type the screen number after the brackets, then press [Enter]. |

As illustrated in Table 3, to display detailed information about a product, an S may be entered in the option field and cal manufacturer. This I/O device places this data. Table 3 illustrates the relative positions of these fields. This function may be limited so that a restricted number of users can input this information.

The CT30 screen corresponding to Table 3 may be used to add the number of a part to memory 140. The user may use a display screen of I/O device 110 to enter the option field the number of the part, the product description, the standard amount, the standard unit of measure, the container type, the quantity unit of measure, the owning division and the names of the manufacturers. Once this date has been entered, this information is stored in memory 140.

Table 4 illustrates the data a user enter in CT40 screen of the I/O device 110 to display the current inventory of the control point.

In order to display this data, the user may input the alpha numeric code for the chemical control point. The remaining fields are displayed by the CPU by obtaining the data from memory. For example, the display of the I/O device 110 may display the alpha numeric code of the chemical control point, the location of the chemical control point by an alphanumeric field, the status of the chemical control point, (for example "A" for Active and "I" for an Inactive chemical control point), the part number of the part or chemical, a description of the product (for example by an alpha numeric field), the quantity of the product stored in the inventory of the chemical control point, the unit of measure in which the product is received and issued, the standard amount, the standard unit of measure and a container type.

TABLE 4

CT40 Field Definitions

| Field Name | Description |
| --- | --- |
| Inventory for Control Point | An 8-digit alphanumeric code. The control point whose inventory is to be displayed. |
| Location | A 30-digit alphanumeric field. Description of the control point's location whose inventory is displayed (display only). |
| Status | A 1-character field. Status of the control point. A—Active, I—Inactive (display only) |
| TI Part#/C# | A 12-digit alphanumeric code. Identifies a product. This may be a TI Part Number or a CHEMTRACK number (display only). |
| Product Description | A 32-digit alphanumeric field. Describes the product (display only). |
| Quantity | An 11-digit numeric field. The quantity of product in the control point's inventory (display only). |
| UM | A 2-character field. Unit of measure in which the product is received and issued. See Appendix A of User Guide for description (display only). |
| Standard Amount | An 8-digit numeric field. Standard amount of the product associated with the given TI Part #/C# (display only). |
| Standard UM | A 2-character field. Standard unit of measure associated with the given TI Part #/C#. See appendix A of User Guide for description (display only). |
| C | A 1-character field. Container type of the product. See Appendix A of User Guide for description (display only). |
| () | A 64-digit alphanumeric field. Use to access another screen. Type the screen number after the brackets, then press [Enter]. |

TABLE 5

CT50 Field Definitions

| Field Name | Description |
| --- | --- |
| Starting with Control Point | An 8-digit alphanumeric code. The control point with which to begin the listing. |
| S | A 1-character field. Use to select a specific control point when accessing detailed information about control point operators and inventory. To be used with (F10 = CP Operators) or (F11 = CPInv). |
| Control Point | An 8-digit alphanumeric code. Control point identifier (display only). |
| Location | A 30-digit alphanumeric field. Description of the control point's location (display only). |
| Status | A 1-digit character field. Control point status. A—Active, I—Inactive (display only). |
| () | A 64-digit alphanumeric field. Use to access another screen. Type the screen number after the brackets, then press [Enter]. |

If a chemical user at the process or an operator of the Chemical Control Point desires to obtain a list of all the control points, a screen including the data in Table 5 displays a list. This display allows the user to view a list of all valid chemical control points, the location of the valid chemical control points and the status of the chemical control points used. The user inputs the starting number of the chemical control point which indicates the first chemical control point to be displayed. The Chemical Control Points, the location, the status of the Chemical Control Point, and an alphanumeric field to access another screen are displayed, 12 at a time.

If a user desires to obtain a list of all operators having clearance to operate a specific Chemical Control Point, a display of the I/O device 110 may be used to obtain such data. Table 5-1 illustrates is data.

by the user inputting the identifying number of the chemical control point. Table 5-1 illustrates the information displayed. It includes the user ID of the operator, the operator name by an alpha-numeric field, the shift code (to indicate the scheduled shift that the operator works), the phone number of the operator and a number to identify the operator through electronic mail (for example message identifier (MSGID) of the operator).

To obtain the data corresponding to the chemical control points where a specific operator has clearance, when the above described operator's information is displayed, an "S" is placed in the field just before the user ID field and F10 is pressed.

The user may desire to display all the control points that an operator has clearance for. Table 5-2 illustrates the data

TABLE 5-1

CT51 Field Definitions

| Field Name | Description |
|---|---|
| Control Point | An 8-digit alphanumeric code. The control point identifier for which a listing of Operator Clearance displays. |
| Location | A 30-digit alphanumeric field. Description of a control point's location (display only). |
| Status | A 1-character field. Control point's status. A—Active, I—Inactive (display only). |
| S | A 1-character field. Use to select a particular operator and list the control points for which they have clearance. To be used with (F10 = Emp Clearance). |
| Userid | An 8-digit alphanumeric field. The IMS Userid of the Operator. |
| Operator Name | A 30-digit alphanumeric field. Employee's name. The name is retrieved from HRDB (display only). |
| Shift | A 1-digit number. Operator's work shift (display only). |
| Work Phone | A 12-digit alphanumeric field. Operator's work phone. The phone number is retrieved from HRDB (display only). |
| MSGID | A 4-digit alphanumeric field. The Operator's message identification number (display only). |
| () | A 64-digit alphanumeric field. Use to access another screen. Type the screen number after the brackets, then press [Enter]. |

As is illustrated in Table 5-1, the operators having clearance for a specific chemical control point may be displayed that is displayed corresponding to all the control points that an operator has clearance for.

TABLE 5-2

CT52 Field Definitions

| Field Name | Description |
|---|---|
| User-ID | An 8-digit alphanumeric field. The IMS Userid of the Operator for which Clearance is displayed. |
| Name | A 30-character field. Operator's name. The name is retrieved from HRDB (display only). |
| Phone # | A 15-digit alphanumeric field. Operator's work phone. The phone number is retrieved from HRDB (display only). |
| Control Point | An 8-digit alphanumeric field. Control point to which the employee has clearance (display only). |
| Location | A 30-digit alphanumeric field. Description of the control point's location (display only). |
| Date Added | A 10-digit alphanumeric field. Date the clearance was granted (display only). |
| Added By | An 8-digit alphanumeric field. IMS Userid of the employee who added the clearance (display only). |
| () | A 64-digit alphanumeric field. Use to access another screen. Type the screen number after the brackets, then press [Enter]. |

The user places a user-ID in the user-ID field of Table 5-2. The chemical control point (by an alpha-numeric code) and the location (by an alpha numeric field) are displayed on the display of the I/O device 110. Table 5-2 corresponds to a display by the I/O device 140 to display a list of control point clearances granted to a specific or predetermined operators. Further, the Table 5-2 corresponds to a display of all operators authorized for a specific or predetermined chemical control point.

To display the chemical control points that have been assigned to a predetermined operator, the user ID of the operator is input to the user ID field. The name of the operator is displayed in the name field in a 30 character field. The phone number is displayed by an alpha numeric field; the control point is displayed by an alpha numeric field that the operator has clearance, the location is displayed by an alpha numeric field describing the location of the control point; the date that the clearance was granted to the operator is displayed by an alpha numeric field and the "added by" alpha-numeric field displays the user ID of the operator who added the clearance to the data base.

In order to list all the operators for a specific chemical control point, a "S" is placed in the chemical control point field and the user ID, name, phone number, location, date added and "added by" information is displayed as described above and as illustrated in Table 5-1. In order to obtain data stored in memory 140 for a specific product, the number of the part is entered in the display of the I/O device 110. Table 6 illustrates the data to be entered to obtain data of all products.

In order to display this data corresponding to a product, the part number of the product is input to the field of starting with #. The display shows the closest match to the part number or part numbers of this select part as sequentially displayed. Additionally, in order to display additional detailed data corresponding to the selected product, a S is placed in the one-digit character field of S. As illustrated in Table 6, the display shows the part number or chemical number by an alpha-numeric code, product description by an alpha-numeric field, the description of the product, the division number to identify the division by an alpha-numeric field, the quantity unit of measure in which the product is received or issued, the quality, the standard unit of measure, the container type, and the number to access another display.

If a user desires to display all products in product description order, Table 7 illustrates the data to be displayed on the display of I/O.

TABLE 6

CT60 Field Definitions

| Field Name | Description |
| --- | --- |
| Starting with # | An 12-digit alphanumeric code. Code identifying a product. This may be a TI Part Number or number which has been assigned by CHEMTRACK |
| S | A 1-digit character field. Use the Select a product to access more detailed information. To be used when (F11 = Prod Info) is pressed. |
| TI Part #/C# | A 12-digit alphanumeric code. Code which identifies a product. This may be a TI Part Number or number which has been assigned by CHEMTRACK (display only). |
| Product Description | A 40-digit alphanumeric field. Describes the product (display only). |
| Div | A 3-digit alphanumeric code. Identifies the originator of the TI Part #/C# of the product. This is usually a Division Number (display only). |
| Qty UM | A 2-character field. Unit of measure in which the product is received and issued. See Appendix A of User Guide for description (display only). |
| Standard Amount | An 8-digit numeric field. Standard amount of the product associated with the given product (display only). |
| Standard UM | A 2-character field. Standard unit of measure associated with the given product. See Appendix A of User Guide for description (display only). |
| C | A 1-character field. Container type of the product. See Appendix A of User Guide for description (display only). |
| () | A 64-digit alphanumeric field. Use to access another screen. Type the screen number after the brackets, then press [Enter]. |

TABLE 7

CT70 Field Definitions

| Field Name | Description |
| --- | --- |
| Description | A 40-digit alphanumeric field. Use to input a partial or complete product description. |
| S | A 1-character field. Use to select a product. To be used when (F11 = Prod Info) is pressed. |
| Product Description | A 40-digit alphanumeric field. Description of the product (display only). |
| TI Part #/C# | A 12-digit alphanumeric code. Identifies a product. This may be a TI Part Number or number which has been assigned by CHEMTRACK (display only). |
| Div | A 3-digit alphanumeric code. Identifies the originator of the TI Part #/C# of the product. This is usually the number of a Division (display only). |
| Qty UM | A 2-character field. Unit of measure in which the product is received and issued. See Appendix A of User Guide for description (display only). |
| Standard Amount | An 8-digit numeric field. Standard amount of the product associated with the given product (display only). |
| Standard UM | A 2-character field. Standard unit of measure associated with the given product. See Appendix A of User Guide for description (display only). |
| C | A 1-digit character field denoting the container type of the product. See Appendix A of User Guide for description (display only). |
| () | A 64-digit alphanumeric field. Use to access another screen. Type the screen number after the brackets, then press [Enter]. |

This display corresponding to Table 7 searches the data base for a specific product and displays further detailed data corresponding to the product. The user inputs either a partial or full description of the chemical product in the description field to display all products meeting that description. The display shows those products which are closest in description stored in memory. If more detailed data corresponding to the product is desired, then the user inputs to the display an "S" in the S field and the display responds with the description of the product, the number of the part to identify the product, the company division where the chemical is used, the quantity and unit measure, the quantity of the product, the standard unit of measure of the product, the container type and the number to access other displays.

If a user desires to obtain data corresponding to a manufacturer, Table 8 illustrates the data to be input to result in the display.

The user enters the exact spelling of the manufacturer name or the closest spelling of the manufacturer known to the user and the name of the manufacturer corresponding to that closest spelling is displayed. To obtain a list of all the specific products of that manufacturer an "S" is entered in the S field.

The data corresponding to the products is displayed as described with reference to Table 9.

TABLE 8

CT80 Field Definitions

| Field Name | Description |
| --- | --- |
| Manufacturer Name | A 40-digit alphanumeric field. Use to input all or part of a chemical manufacturer's name. |
| S | A 1-character field. Use to select a specific manufacturer for which all products should be displayed when the F9 key is pressed. |
| Manufacturer Name | A 40-digit alphanumeric field. A chemical manufacturer's name (display). |
| () | A 64-digit alphanumeric field. Use to access another screen. Type the screen number after the brackets, then press [Enter]. |

TABLE 9

CT90 Field Definitions

| Field Name | Description |
| --- | --- |
| Manufacturer Name | A 40-digit alphanumeric field. Use to input all or part of a chemical manufacturer's name. |
| S | A 1-character field. Use to select a product. To be used before (F11 = Prod Info) is pressed. |
| Product Description | A 40-digit alphanumeric field. Description of the product (display only). |
| TI Part #/C# | A 12-digit alphanumeric code. Identifies a product. This may be a TI Part Number or number which has been assigned by CHEMTRACK (display only). |
| Div | A 3-digit alphanumeric code. Identifies the originator of the TI Part #/C# of the product. This is usually the number of a Division (display only). |
| Qty UM | A 2-character field. Unit of measure in which the product is received and issued. See Appendix A of User Guide for description (display only). |
| Standard Amount | An 8-digit numeric field. Standard amount of the product associated with the given TI Part #/C# (display only). |
| Standard UM | A 2-character field. Standard unit of measure associated with the given TI Part #/C#. See Appendix A of User Guide for description (display only). |
| C | A 1-character field. Container type of the product. See Appendix A of User Guide for description (display only). |
| ( ) | A 64-digit alphanumeric field. Use to access another screen. Type the screen number after the brackets, then press [Enter]. |

As illustrated in Table 9, the data displayed to obtain detailed manufacturer information is shown. For example, the manufacturer name is entered in the display which may have been received from the display corresponding to Table 8, and the number of the part, the product description, the company division where the chemical is used, the quantity and unit of measurement, the container type, and the screen number is used to access another screen.

The user may desire to add or delete an operator having clearance to operate a chemical control point. Table 9 illustrates data to be displayed and used to either add or delete an operator for clearance of a particular chemical control point.

Figure 2:
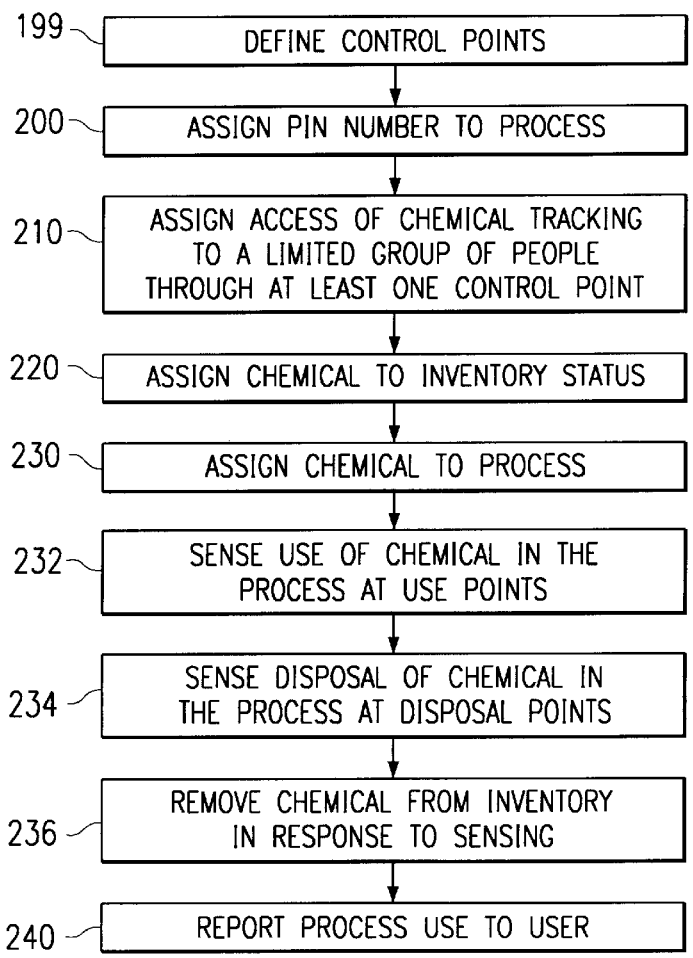
FIG. 2 illustrates a flow chart of the present invention.

The operation of the invention is illustrated in FIG. 2. At step 199, a plurality of control points are defined. At step 200, a PIN number is assigned to the process. At step 210, access is assigned to a limited group of people (for example, the operator, for chemical tracking) through at least one of the control points. At step 220, chemicals are assigned to inventory status as these chemicals arrive into inventory. At step 230, the chemicals are assigned to a process corresponding to the PIN. At step 232, use of the chemicals is sensed at various use points. At step 234, disposal of the chemicals is sensed at various disposal points. At step 236, the chemicals are removed from the inventory in response to the sensings steps. At step 240, the use of the chemical at the process is reported to the user.

TABLE 10

CTSEC Field Definitions

| Field Name | Description |
| --- | --- |
| Option | A one-digit character field used to input whether an add or delete is being requested. |
| Employee Userid | An 8-digit alphanumeric field. The IMS userid of the employee for which the clearance is being added or deleted. |
| Name | A 30-digit character field used to display the employee's name. The name is retrieved from HRDB (display only). |
| Control Point | An 8-digit alphanumeric field denoting the control point for which the clearance is to be added or deleted. |
| Location | A 30-digit alphanumeric field used to display the location information of the control point to which the clearance is being added or deleted (display only). |
| ( ) | A 64-digit alphanumeric field. Use to access another screen. Type the screen number after the brackets, then press [Enter]. |

As shown in Table 10, the data to be entered in a display is the option, for example an A to add or a D to delete the operator, the ID of the operator to be added or deleted, the chemical control point where adding or deleting an operator is called for.

One of the functions of all the screens will be to indicate a number to access all other screens.

The memory 140 may be a Random Access Memory (RAM), Read-Only Memory (ROM), etc.

What is claimed is:

1. A method for controlling a chemical for use in a process, the method of comprising the steps of:

defining a plurality of control points, at least one of said control points used to control the process;

assigning a process identification number (PIN) to the process;

identifying a plurality of operators, at least one of said operators assigned to said at least one of said control points;

allowing only said at least one of said operators to inventory the chemical to said at least one of said control points for the use in the process;

allowing only said at least one of said operators to issue the chemical from said inventory for the use in the process;

sensing the use of the chemical in the process at a plurality of use points;

sensing disposal of the chemical in the process at a plurality of disposal points; and removing the chemical from said inventory in response to said sensing steps.

2. The method of claim 1 further including the step of reporting the use and disposal of the chemical in response to said sensing steps.

* * * * *

UNITED STATES PATENT AND TRADEMARK OFFICE
CERTIFICATE OF CORRECTION

PATENT NO.    : 6,108,617
DATED         : August 22, 2000
INVENTOR(S)   : Schomer It is certified that error appears in the above-identified patent and that said Letters Patent is hereby corrected as shown below:

<u>Title page,</u>
Insert -- [*] Notice:   Under 35 U.S.C. 154(b), the term of this patent shall be extended for 1019 days. --

Signed and Sealed this

First Day of July, 2003

JAMES E. ROGAN
*Director of the United States Patent and Trademark Office*